No. 678,520. Patented July 16, 1901.
L. C. SAVALE.
AUTOMOBILE.
(Application filed May 29, 1901.)
(No Model.) 2 Sheets—Sheet 1.
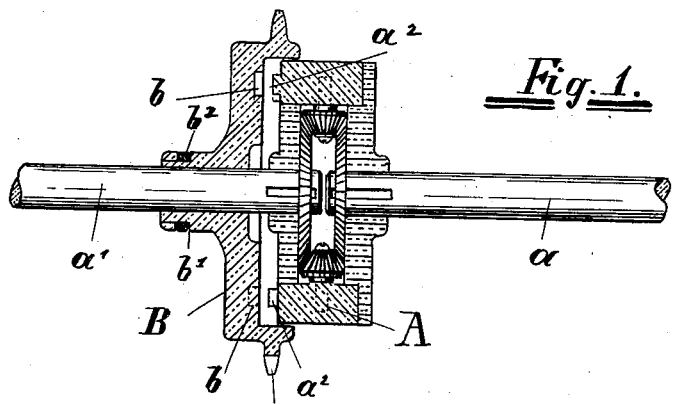
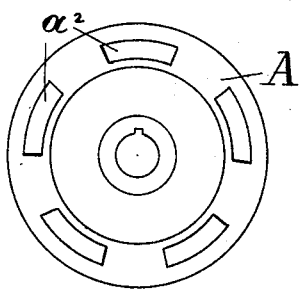
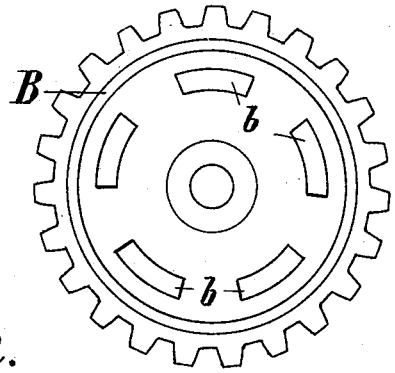
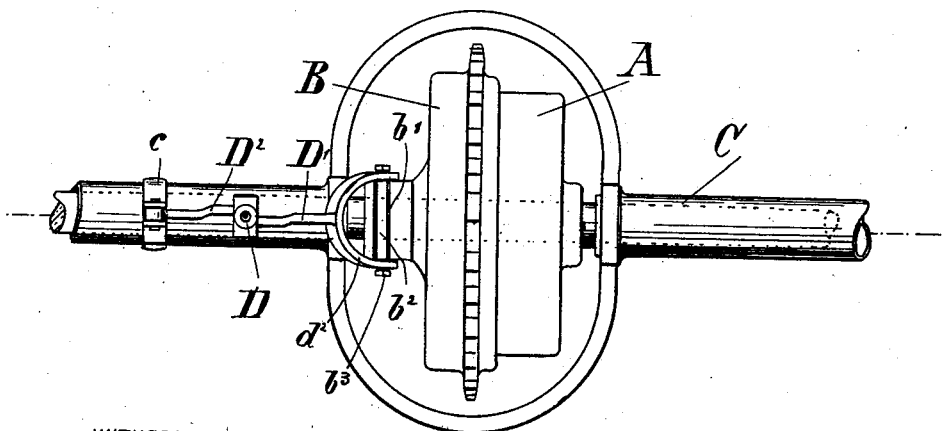
WITNESSES:
Stella A. Hughes
L. F. Boise
INVENTOR
Louis C. Savale
BY John F. Kerr
ATTORNEY No. 678,520. Patented July 16, 1901.
L. C. SAVALE.
AUTOMOBILE.
(Application filed May 29, 1901.)
(No Model.) 2 Sheets—Sheet 2.
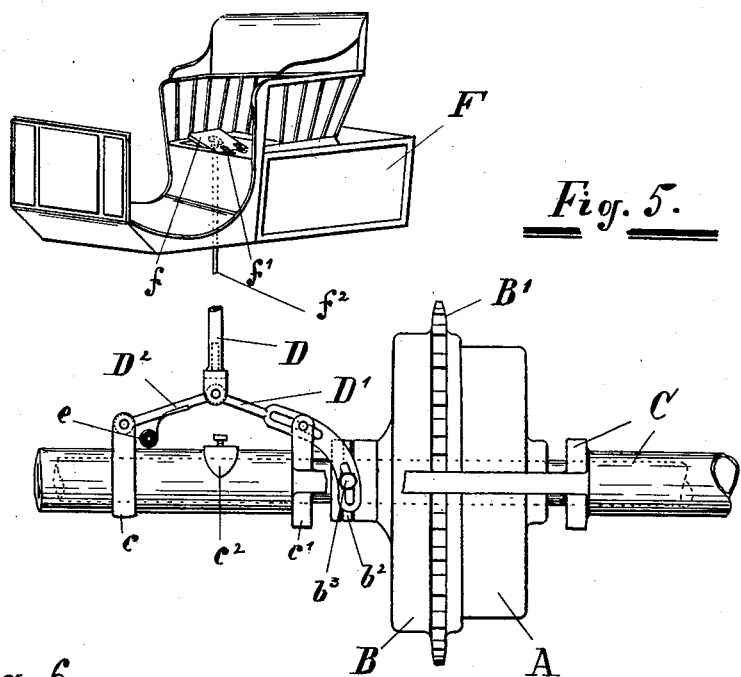
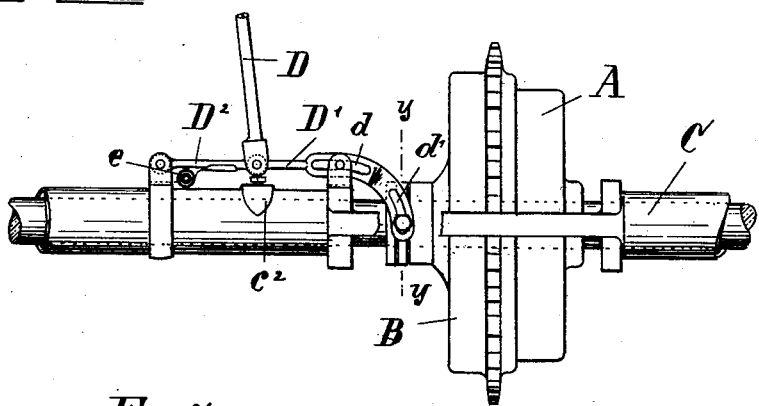
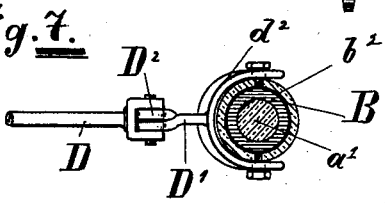
WITNESSES:
INVENTOR
Louis C. Savale
BY
John F. Kerr
ATTORNEY

UNITED STATES PATENT OFFICE.

LOUIS C. SAVALE, OF PATERSON, NEW JERSEY.

AUTOMOBILE.

SPECIFICATION forming part of Letters Patent No. 678,520, dated July 16, 1901.

Application filed May 29, 1901. Serial No. 62,328. (No model.)

*To all whom it may concern:*

Be it known that I, LOUIS C. SAVALE, a citizen of the United States, residing at 72 Pearl street, city of Paterson, in the county of Passaic and State of New Jersey, have invented certain new and useful Improvements in Automobiles, of which the following is a specification, reference being had therein to the accompanying drawings.
My invention relates to improvements in automobiles in which compensating gearing is employed in conjunction with sprocket-wheels and a sprocket-chain for driving the same; and the objects of my invention are, first, to provide a clutch device which will automatically stop the vehicle when the rider gets off the seat or when he is thrown off in case of accident, which will prevent the running away of the vehicle and its possible destruction, and, second, to enable the rider to stop the vehicle without stopping the engine or motor. I attain these objects by the mechanism illustrated in the accompanying drawings, which form a part of this specification, in which similar letters of reference indicate like parts in the different figures, and in which—

Figure 1 is a sectional view through my combination running-gear and clutch; Fig. 2, a top view of the same connected with the auto-frame, parts being omitted; Fig. 3, a side view of compensating gear, showing lugs or clutch-jaws adapted to enter or dovetail into the openings of a sprocket-gear; Fig. 4, a side view of sprocket-gear, showing the openings for the clutch-jaws; Fig. 5, a combination side and top view of auto-body and my safety stopping device, showing the connection between the auto-body and my device, part of the connecting-rod being broken away, and illustrating the position of my device and the sprocket-gear when the vehicle is not running; Fig. 6, a side view of my device, illustrating the position of the same and the sprocket when the vehicle is running; Fig. 7, a sectional view on the line $y\,y$ in Fig. 6, being a detail, showing construction and operation of a portion of my device.

My device may be employed to act in conjunction with any type of compensating gear, and in this application I make no claim to any special construction of gearing, but wish to confine myself to the clutching and releasing devices in combination with any driving mechanism or compensating gearing, for the purposes herein described and set forth, the principal object of my invention being, as stated, to stop the vehicle without stopping the operation of the motor.

A represents a set of compensating gear-wheels of any desired type, used in conjunction with the back axle $a$ and $a'$, and provided with clutch-jaws $a^2$, adapted to lock or dovetail in the slots or openings $b$, which are provided in the sprocket-gear B to receive them.

The sprocket B is provided with the usual teeth B' and a recess $b'$, formed in the hub thereof, in which a loose collar $b^2$ is adapted to fit, so as not to interfere with the rotation of the sprocket.

The axle $a$ and $a'$ is mounted in the auto-frame, of which C represents a portion.

On the auto-frame are provided brackets $c$ and $c'$, which are fixed securely thereto, and an adjustable stopper $c^2$ to regulate the downward course of the connecting-rod D, which passes from the seat of the vehicle to the clutch-levers D' and D².

In the levers D' are openings $d$ and $d'$. The levers D' and D² are pivotally connected in the bifurcated lower end of the connecting-rod D, as shown in Fig. 7. The other end of the lever D² is pivotally connected in the upper end of the bracket $c$, and the other end of the lever D' is bifurcated, so as to pass on both sides of the hub of the sprocket B.

Through the elongated openings in the bifurcated end $d^2$ of the lever D' guide-screws $b^3$ pass and are fastened into the loose collar $b^2$, as shown in Figs. 2, 5, 6, and 7. Through the other elongated opening in the lever D' a guide-pivot passes and holds said lever in the brackets $c'$.

Under and pressing against the lever-arm D² and connected with the bracket $c$ is a strong spring $e$, which causes the rod D and the inner ends of the levers D' and D², which are pivotally connected with its lower end, to rise, thereby withdrawing the sprocket B away from and out of engagement with the jaw-clutches $a^2$ on the compensating gear-frame and causing the vehicle to stop. The bifurcated ends of the lever D' being secured to the loose collar $b^2$, the sprocket B continues to revolve, although the vehicle has stopped. The upper end of the connecting-rod D when the sprocket B is thus out of engagement will force upward a part of the seat $f$, which is hinged at $f'$ in the auto-body F. The sprocket B will remain thus out of engagement and the vehicle will be at rest, although the engine or motor be running, and will remain at rest until the rider sits down on the seat $f$, which will then force down the levers $D'$ and $D^2$ and press the sprocket B into engagement with the clutch-jaws $a^2$, when the axle will be rotated and the vehicle will move. If the rider gets up from his seat, the vehicle will stop, so that it is obvious if the vehicle should strike an obstacle on the road and the driver should be thrown from the vehicle it would be automatically stopped and saved from the destruction that might result if the vehicle ran away.

The loose collar $b^2$ is so constructed that the sprocket B freely turns therein. The location of the jaws and clutches may be reversed.

It is not deemed necessary for the purposes of this specification to show the usual sprocket-chain connecting the sprocket B with the sprocket of the motor.

With this description of my invention, what I claim is—

1. The combination with the rear axle, of a compensating-gear covering, provided with jaw-clutches, a sprocket adapted to rotate, and movable horizontally on said rear axle, and provided with jaws adapted to engage said jaw-clutches, substantially as set forth.

2. The combination with the rear axle, of a compensating-gear covering, provided with jaw-clutches, a sprocket adapted to rotate, and movable horizontally on said rear axle, and provided with jaws adapted to engage said jaw-clutches, an annular recess in the hub of said sprocket, a ring mounted loosely in said recess, a lever having a bifurcated end provided with elongated openings, guide-pins passed through said openings and secured to said loose ring, another lever having one end pivotally secured to the auto-frame, the inner ends of both levers pivotally secured in the bifurcated lower end of a vertical rod, said vertical rod passing up to the seat of the vehicle, and a spring adapted to press the inner ends of said levers, and the rod, in which they are pivotally connected, upward to raise the lid in the seat of the vehicle, and withdraw the sprocket from engagement with said jaw-clutches, substantially as set forth.

3. In an automobile, the rear axle, and compensating gear-wheels, in combination with a sprocket-wheel rotatable on said axle, and constructed so as to grip or release the compensating gear mechanism, said sprocket being movable horizontally on said axle, means for rotating said sprocket, and means for moving the same horizontally on said axle, either into, or out of, engagement with said system of compensating gear-wheels, substantially as set forth.

In testimony whereof I affix my signature in presence of two witnesses.

LOUIS C. SAVALE.

Witnesses:
STELLA A. HUGHES,
JOHN F. KERR.